(12) United States Patent
Neubauer

(10) Patent No.: US 7,909,891 B2
(45) Date of Patent: Mar. 22, 2011

(54) AZO DYES FOR DYEING AND PRINTING HYDROPHOBIC MATERIALS

(75) Inventor: Stefan Neubauer, Köln (DE)

(73) Assignee: DyStar Colours Deutschland GmbH, Frankfurt Am Main (DE)

( * ) Notice: Subject to any disclaimer, the term of this patent is extended or adjusted under 35 U.S.C. 154(b) by 0 days.

(21) Appl. No.: 12/679,314

(22) PCT Filed: Sep. 15, 2008

(86) PCT No.: PCT/EP2008/062214
§ 371 (c)(1),
(2), (4) Date: Jun. 8, 2010

(87) PCT Pub. No.: WO2009/037215
PCT Pub. Date: Mar. 26, 2009

(65) Prior Publication Data
US 2010/0281629 A1  Nov. 11, 2010

(30) Foreign Application Priority Data
Sep. 22, 2007 (DE) .................. 10 2007 045 364

(51) Int. Cl.
*D06P 1/02* (2006.01)
(52) U.S. Cl. .................. 8/666; 8/693; 8/662; 534/573; 534/579; 101/483; 101/491
(58) Field of Classification Search .......... 8/666, 693, 8/662; 101/483, 491; 534/573, 579
See application file for complete search history.

(56) References Cited

U.S. PATENT DOCUMENTS
5,420,254 A    5/1995   Altermatt et al.

FOREIGN PATENT DOCUMENTS
DE   4335261   *  4/1994
DE   4335261 A1   4/1994
GB    909843     11/1962
WO   WO-2005/056690 A1   6/2005
WO   WO-2006/061438 A1   6/2006

* cited by examiner

*Primary Examiner* — Lorna M Douyon
*Assistant Examiner* — Amina Khan
(74) *Attorney, Agent, or Firm* — Connolly Bove Lodge & Hutz LLP

(57) ABSTRACT

The invention relates to a dye of the general formula (I)

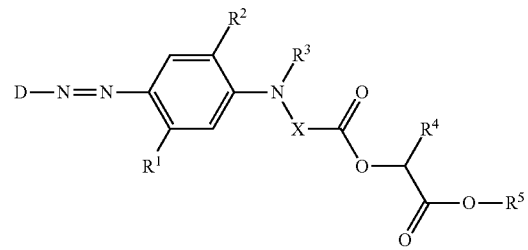

where
D is the residue of a diazo component;
$R^1$ is hydrogen, $(C_1\text{-}C_6)$-alkyl, $(C_1\text{-}C_4)$-alkoxy, hydroxyl, halogen, —NHCHO, —NHCO$(C_1\text{-}C_6)$-alkyl, —NHCOaryl, —NHSO$_2(C_1\text{-}C_6)$-alkyl or —NHSO$_2$aryl;
$R^2$ is hydrogen, $(C_1\text{-}C_6)$-alkyl, $(C_1\text{-}C_4)$-alkoxy, phenoxy or halogen;
$R^3$ is hydrogen, $(C_1\text{-}C_6)$-alkyl, substituted $(C_1\text{-}C_6)$-alkyl, $(C_3\text{-}C_4)$-alkenyl or substituted $(C_3\text{-}C_4)$-alkenyl;
or $R^2$ and $R^3$ combine to form the radical —C*H(CH$_3$)CH$_2$C(CH$_3$)$_2$—, where the carbon atom marked * is attached to the phenyl nucleus;
$R^4$ is hydrogen, $(C_1\text{-}C_6)$-alkyl or phenyl;
$R^5$ is vinyl or a group of the formula —CHR$^6$COR$^7$, where $R^6$ is hydrogen, $(C_1\text{-}C_6)$-alkyl or phenyl; $R^7$ is $(C_1\text{-}C_6)$-alkyl, substituted $(C_1\text{-}C_6)$-alkyl, phenyl or substituted phenyl; and
X is $C_1\text{-}C_5$-alkylene.
The invention for relates to a process to prepare the dye and their use.

11 Claims, No Drawings

AZO DYES FOR DYEING AND PRINTING HYDROPHOBIC MATERIALS

CROSS-REFERENCE TO RELATED APPLICATIONS

This application is a national stage application (under 35 U.S.C. §371) of PCT/EP2008/062214, filed Sep. 15, 2008, which claims benefit of German application 10 2007 045 364.9, filed Sep. 22, 2007.

BACKGROUND OF THE INVENTION

The present invention relates to disperse azo dyes in which novel-substituted oxycarbonylmethyl esters are linked to the chromophore. Dyes comprising a similar structural element are already known and are described for example in GB 909843 and DE 4335261 A1.

It has now been found that disperse azo dyes in which the structural element mentioned is linked to further selected structural elements in a certain way have outstanding properties and that dyeings prepared therewith are notable for excellent washfastnesses and good sublimation fastnesses.

BRIEF SUMMARY OF THE INVENTION

The present invention provides dyes of the general formula (I)

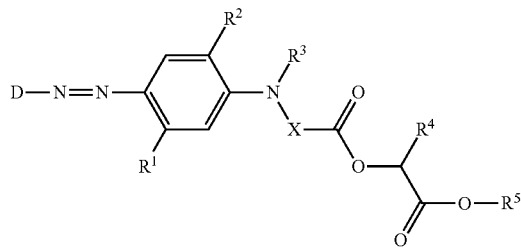

where
D is the residue of a diazo component;
$R^1$ is hydrogen, $(C_1-C_6)$-alkyl, $(C_1-C_4)$-alkoxy, hydroxyl, halogen, —NHCHO, —NHCO$(C_1-C_6)$-alkyl, —NHCOaryl, —NHSO$_2(C_1-C_6)$-alkyl or —NHSO$_2$aryl;
$R^2$ is hydrogen, $(C_1-C_6)$-alkyl, $(C_1-C_4)$-alkoxy, phenoxy or halogen;
$R^3$ is hydrogen, $(C_1-C_6)$-alkyl, substituted $(C_1-C_6)$-alkyl, $(C_3-C_4)$-alkenyl or substituted $(C_3-C_4)$-alkenyl;
  or $R^2$ and $R^3$ combine to form the radical —C*H(CH$_3$)CH$_2$C(CH$_3$)$_2$—, where the carbon atom marked * is attached to the phenyl nucleus;
$R^4$ is hydrogen, $(C_1-C_6)$-alkyl or phenyl;
$R^5$ is vinyl or a group of the formula —CHR$^6$COR$^7$, where $R^6$ is hydrogen, $(C_1-C_6)$-alkyl or phenyl; $R^7$ is $(C_1-C_6)$-alkyl, substituted $(C_1-C_6)$-alkyl, phenyl or substituted phenyl; and
X is $(C_1-C_5)$-alkylene.

DETAILED DESCRIPTION OF THE INVENTION

Residues D of a diazo component are in particular the residues customary in the field of disperse dyes and known to one skilled in the art.

Preferably, D represents a group of the formula (IIa)

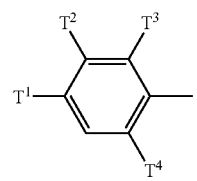

where
$T^1$ and $T^2$ are independently hydrogen, $(C_1-C_6)$-alkyl, $(C_1-C_4)$-alkoxy, —SO$_2$ $(C_1-C_6)$-alkyl, —SO$_2$ aryl, cyano, halogen or nitro; and
$T^4$ and $T^3$ are independently hydrogen, halogen, trifluoromethyl, cyano, —SCN, —SO$_2$CH$_3$ or nitro;
with the proviso that at least one of $T^1$, $T^2$, $T^3$ and $T^4$ is not hydrogen;
or represents a group of the formula (IIb)

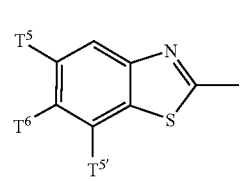

where
$T^5$ and $T^{5'}$ are independently hydrogen or halogen; and
$T^6$ is hydrogen, —SO$_2$CH$_3$, —SCN, $(C_1-C_4)$-alkoxy, halogen or nitro;
with the proviso that at least one of $T^5$, $T^{5'}$ and $T^6$ is not hydrogen;
or represents a group of the formula (IIc)

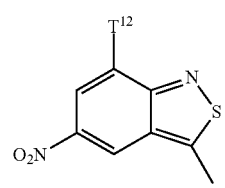

where
$T^{12}$ is hydrogen or halogen;
or represents a group of the formula (IId)

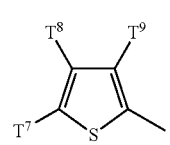

where $T^7$ is nitro, —CHO, cyano, —COCH$_3$, or a group of the formula

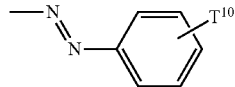

where $T^{10}$ is hydrogen, halogen, nitro or cyano;
$T^8$ is hydrogen, (C$_1$-C$_6$)-alkyl or halogen; and
$T^9$ is nitro, cyano, —COCH$_3$ or —COOT$^{11}$; where $T^{11}$ is (C$_1$-C$_4$)-alkyl;
or represents a group of the formula (IIe)

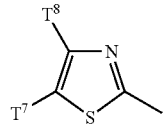

(IIe)

where $T^7$ and $T^8$ are each as defined above;
or represents a group of the formula (IIf)

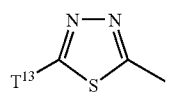

(IIf)

where $T^{13}$ is phenyl or S—(C$_1$-C$_4$)-alkyl;
or represents a group of the formula (IIg)

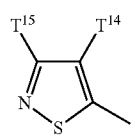

(IIg)

where $T^{14}$ is cyano or —COCH$_3$ or —COOT$^{11}$, where $T^{11}$ is (C$_1$-C$_4$)-alkyl; and $T^{15}$ is phenyl or (C$_1$-C$_4$)-alkyl;
or represents a group of the formula (IIh)

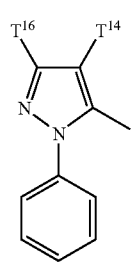

(IIh)

where $T^{14}$ is as defined above and $T^{16}$ is (C$_1$-C$_4$)-alkyl;
or represents a group of the formula (IIi)

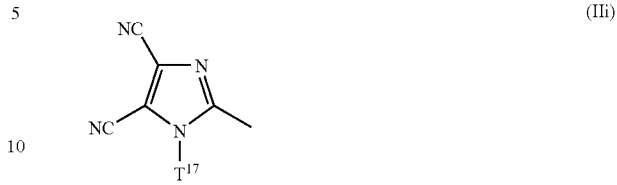

(IIi)

where $T^{17}$ is cyanomethyl, benzyl or allyl;
or represents a group of the formula (IIj)

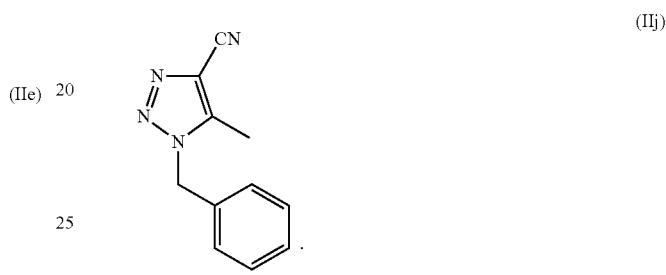

(IIj)

(C$_1$-C$_6$)-Alkyl groups may be straight chain or branched and are for example methyl, ethyl, n-propyl, i-propyl, n-butyl, i-butyl, tert-butyl, n-pentyl or n-hexyl. Analogous considerations apply to alkoxy groups, which are methoxy or ethoxy for example. (C$_3$-C$_4$)-Alkenyl groups are in particular allyl. (C$_1$-C$_5$)-Alkylene groups may be straight chain or branched and are for example methylene, ethylene, propylene, butylene, i-propylene or i-butylene.

Substituted (C$_1$-C$_6$)-alkyl and (C$_3$-C$_4$)-alkenyl groups are substituted in particular by 1 to 3 substituents selected from the group consisting of halogen, cyano, hydroxyl, (C$_1$-C$_6$)-alkoxy, —COO(C$_1$-C$_6$)-alkyl, —COOaryl, —OCOO(C$_1$-C$_6$)-alkyl, —OCOOaryl, —OCO(C$_1$-C$_6$)-alkyl, phenyl, —OCOphenyl and phenoxy.

Aryl is in particular phenyl or naphthyl, —NHSO$_2$aryl is in particular phenylsulfonylamino.

When phenyl groups are substituted, they bear one or more, in particular 1, 2 or 3, substituents selected from the group consisting of halogen, (C$_1$-C$_4$)-alkyl, (C$_1$-C$_4$)-alkoxy, phenyl, nitro, cyano, trifluoromethyl or —SO$_2$CH$_3$.

Halogen is preferably chlorine or bromine.

$R^1$ is preferably hydrogen, chlorine, methyl, ethyl, hydroxyl, methoxy, ethoxy, acetylamino, propionylamino, benzoylamino, methylsulfonylamino, ethylsulfonylamino or phenylsulfonylamino.

$R^2$ is preferably hydrogen, chlorine, methyl, ethyl, methoxy, ethoxy or phenoxy.

$R^3$ is preferably hydrogen, methyl, ethyl, propyl, butyl, benzyl, phenylethyl, phenoxyethyl, methoxyethyl, cyanoethyl, —C$_2$H$_4$OCOCH$_3$, —C$_2$H$_4$OCOC$_2$H$_5$, —C$_2$H$_4$COOCH$_3$, —C$_2$H$_4$COOC$_2$H$_5$ or allyl.

$R^4$ is preferably is hydrogen, methyl or phenyl, more preferably hydrogen.

$R^6$ is preferably hydrogen, methyl or phenyl, more preferably hydrogen;

$R^7$ is preferably methyl, ethyl or phenyl;

X is preferably —CH$_2$—, —C$_2$H$_4$—, —C$_3$H$_6$—, —CH(CH$_3$)CH$_2$— or —CH$_2$CH(CH$_3$)—, more preferably —C$_2$H$_4$—.

Preferred dyes of the present invention conform to the general formula (Ia)

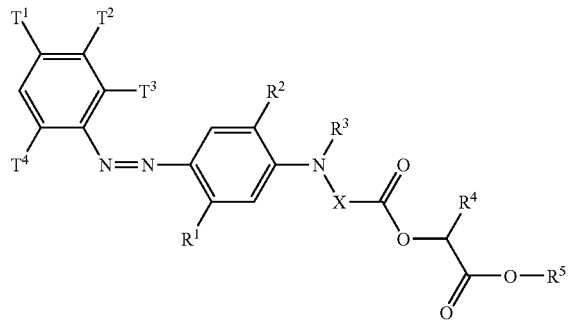

(Ia)

where $T^1$ to $T^4$, $R^1$ to $R^5$ and X are each as defined above.

Particularly preferred dyes of the general formula (Ia) according to the invention conform to the general formula (Iaa)

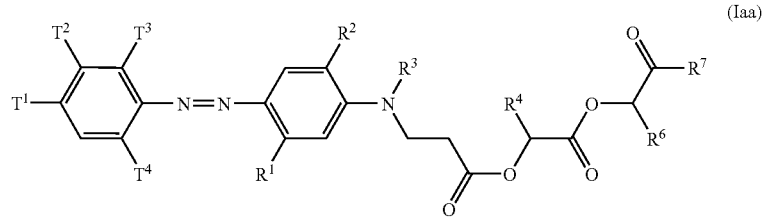

(Iaa)

where
$T^1$ is hydrogen, nitro, halogen or methyl;
$T^2$ is hydrogen, nitro or chlorine;
$T^3$ is hydrogen, cyano, chlorine or bromine;
$T^4$ is hydrogen, cyano, nitro, chlorine, bromine or trifluoromethyl;
$R^1$ is hydrogen, hydroxyl, chlorine, methyl, acetylamino, propionylamino, benzoylamino, phenylsulfonylamino or methylsulfonylamino;
$R^2$ is hydrogen, chlorine, methyl, phenoxy, methoxy or ethoxy;
$R^3$ is hydrogen, methyl, ethyl, butyl, benzyl, phenylethyl, phenoxyethyl, methoxyethyl or allyl;
$R^4$ is hydrogen, methyl or phenyl;
$R^6$ is hydrogen, methyl or phenyl; and
$R^7$ is methyl, ethyl, phenyl.

Further particularly preferred dyes of the present invention conform to the general formula (Iab)

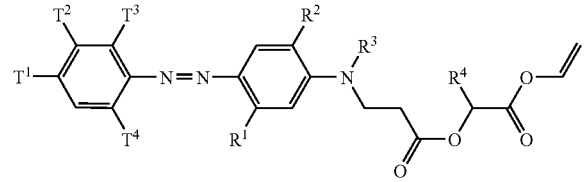

(Iab)

where
$T^1$ is hydrogen, nitro, halogen or methyl;
$T^2$ is hydrogen, nitro or chlorine;
$T^3$ is hydrogen, cyano, chlorine or bromine;
$T^4$ is hydrogen, cyano, nitro, chlorine, bromine or trifluoromethyl;
$R^1$ is hydrogen, hydroxyl, chlorine, methyl, acetylamino, propionylamino, benzoylamino, phenylsulfonylamino or methylsulfonylamino;
$R^2$ is hydrogen, chlorine, methyl, phenoxy, methoxy or ethoxy;
$R^3$ is hydrogen, methyl, ethyl, butyl, benzyl, phenylethyl, phenoxyethyl, methoxyethyl or allyl;
$R^4$ is hydrogen, methyl or phenyl.

Further preferred dyes of the present invention conform to the general formula (Ib)

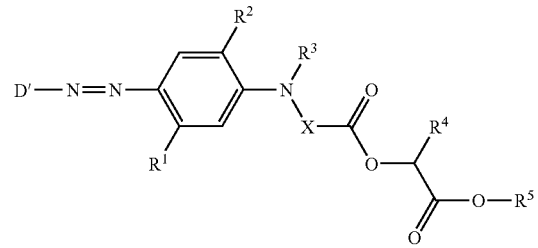

(Ib)

where $R^1$ to $R^5$ and X are each as defined above and D' represents 3,5-dicyano-4-chloro-2-thienyl, 3,5-dicyano-2-thienyl, 3,5-dicyano-4-methyl-2-thienyl, 3-cyano-5-nitro-2-thienyl, 3-cyano-4-chloro-5-formyl-2-thienyl, 3,5-dinitro-2-thienyl, 3-acetyl-5-nitro-2-thienyl, 5-acetyl-3-nitro-2-thienyl, 3-(($C_1$-$C_4$)-alkoxycarbonyl)-5-nitro-2-thienyl, 5-phenylazo-3-cyano-2-thienyl, 5-(4-nitrophenylazo)-3-cyano-2-thienyl, 5-nitro-2-thiazolyl, 4-chloro-5-formyl-2-thiazolyl-, 5-nitro-3-benzisothiazolyl, 7-bromo-5-nitro-3-benzisothiazolyl, 7-chloro-5-nitro-3-benzisothiazolyl, 3-methyl-4-cyano-5-isothiazolyl, 3-phenyl-1,2,4-thiadiazol-2-yl, 5-($C_1$-$C_2$)-alkylmercapto))-1,3,4-thiadiazol-2-yl, 1-cyanomethyl-4,5-dicyano-2-imidazolyl, 6-nitro-2-benzthiazolyl, 5-nitro-2-benzthiazolyl, 6-rhodano-2-benzthiazolyl, 6-chloro-2-benzthiazolyl or (5),6,(7)-dichloro-2-benzthiazolyl.

Particularly preferred dyes of the general formula (Ib) according to the present invention conform to the formula (Iba)

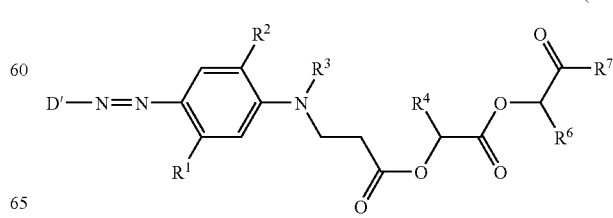

(Iba)

where

D' is as defined above;

$R^1$ is hydrogen, hydroxyl, chlorine, methyl, acetylamino, propionylamino, benzoylamino, phenylsulfonylamino or methylsulfonylamino;

$R^2$ is hydrogen, chlorine, methyl, phenoxy, methoxy or ethoxy;

$R^3$ is hydrogen, methyl, ethyl, butyl, benzyl, phenylethyl, phenoxyethyl, methoxyethyl or allyl;

$R^4$ is hydrogen, methyl or phenyl;

$R^6$ is hydrogen, methyl or phenyl; and $R^7$ is methyl, ethyl, phenyl.

Further particularly preferred dyes of the general formula (Ib) according to the present invention conform to the formula (Ibb)

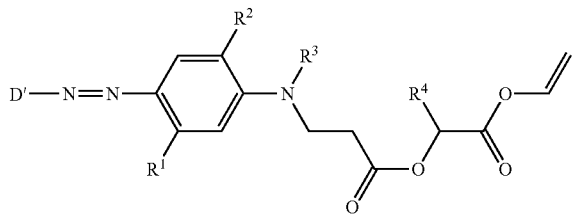

(Ibb)

where

D' is as defined above;

$R^1$ is hydrogen, hydroxyl, chlorine, methyl, acetylamino, propionylamino, benzoylamino, phenylsulfonylamino or methylsulfonylamino;

$R^2$ is hydrogen, chlorine, methyl, phenoxy, methoxy or ethoxy;

$R^3$ is hydrogen, methyl, ethyl, butyl, benzyl, phenylethyl, phenoxyethyl, methoxyethyl or allyl;

$R^4$ is hydrogen, methyl or phenyl.

The dyes of the general formula (I) according to the present invention can be prepared by methods known to one skilled in the art.

For instance, a compound of the general formula (III)

D-NH$_2$      (III)

where D is as defined above, is diazotized and coupled onto a compound of the general formula (IV)

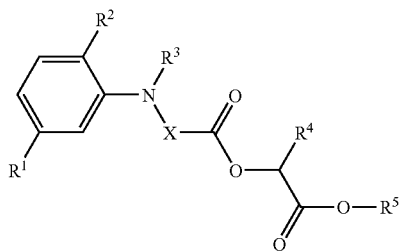

(IV)

where $R^1$ to $R^5$ and X are each as defined above.

The compounds of the general formula (III) are generally diazotized in a known manner, for example with sodium nitrite in an acidic aqueous medium, for example in an aqueous medium rendered acidic with hydrochloric acid or sulfuric acid, or with nitrosylsulfuric acid in dilute sulfuric acid, phosphoric acid or a mixture of acetic and propionic acids. The preferred temperature range is between 0° C. and 15° C.

The diazotized compounds are generally likewise coupled onto the compounds of the general formula (IV) in a known manner, for example in an acidic, aqueous, aqueous-organic or organic medium, with particular advantage at temperatures below 10° C. Acids used are in particular sulfuric acid, acetic acid or propionic acid.

The compounds of the general formulae (III) and (IV) are known or can be prepared by known methods.

The dyes of the general formula (I) according to the present invention are outstandingly useful for dyeing and printing hydrophobic materials in that the dyeings and prints obtained are notable for level shades and high service fastnesses. Deserving of emphasis are excellent washfastnesses and very good sublimation fastnesses.

The present invention thus also provides for the use of the dyes of the general formula I for dyeing and printing hydrophobic materials, and processes for dyeing or printing such materials which utilize as colorants one or more dyes of the general formula (I) according to the present invention.

The hydrophobic materials mentioned can be of synthetic or semisynthetic origin. Hydrophobic materials contemplated include for example secondary cellulose acetate, cellulose triacetate, polyamides, polylactides and, in particular, macromolecular polyesters. Materials composed of macromolecular polyester are in particular those based on polyethylene terephthalates or polytrimethylene terephthalates. Blend fabrics and blend fibers such as for example polyester-cotton or polyester-elastane are also contemplated. The hydrophobic synthetic materials may be in the form of self-supporting films or fabric- or thread-shaped structures and may have been processed for example into yarns or woven or knit textile fabrics. Preference is given to fibrous textile materials, which can also be present in the form of microfibers for example.

The dyeing in accordance with the use according to the present invention can be effected in a conventional manner, preferably from an aqueous dispersion, if appropriate in the presence of carriers, between 80 to about 110° C. by the exhaust method or by the HT method in a dyeing autoclave at 110 to 140° C., and also by the so-called thermofix method in which the fabric is padded with the dyeing liquor and subsequently fixed/set at about 180 to 230° C.

Printing of the materials mentioned can be carried out in a manner known per se by incorporating the dyes of the general formula (I) of the present invention in a print paste and treating the fabric printed therewith at temperatures between 180 to 230° C. with HT steam, high-pressure steam or dry heat, if appropriate in the presence of a carrier, to fix the dye.

The dyes of the general formula (I) of the present invention shall be in a very fine state of subdivision when they are used in dyeing liquors, padding liquors or print pastes.

The dyes are converted into the fine state of subdivision in a conventional manner by slurrying the as-fabricated dye together with dispersants in a liquid medium, preferably in water, and subjecting the mixture to the action of shearing forces to mechanically comminute the original dye particles to such an extent that an optimal specific surface area is achieved and sedimentation of the dye is minimized. This is accomplished in suitable mills, such as ball or sand mills. The particle size of the dyes is generally between 0.5 and 5 μm and preferably between 0.9 and 1.1 μm.

The dispersants used in the milling operation can be non-ionic or anionic. Nonionic dispersants include for example reaction products of alkylene oxides, for example ethylene oxide or propylene oxide, with alkylatable compounds, for example fatty alcohols, fatty amines, fatty acids, phenols, alkylphenols and carboxamides. Anionic dispersants are for example lignosulfonates, alkyl- or alkylarylsulfonates or alkylaryl polyglycol ether sulfates.

The dye preparations thus obtained shall be pourable for most applications. Accordingly, the dye and dispersant content is limited in these cases. In general, the dispersions are adjusted to a dye content up to 50 percent by weight and a dispersant content up to about 25 percent by weight. For economic reasons, dye contents are in most cases not below 15 percent by weight.

The dispersions may also contain still further auxiliaries, for example those which act as oxidizing agents, for example sodium m-nitrobenzenesulfonate, or fungicidal agents, for example sodium o-phenylphenoxide and sodium pentachlorophenoxide, and particularly so-called "acid donors", examples being butyrolactone, monochloroacetamide, sodium chloroacetate, sodium dichloroacetate, the sodium salt of 3-chloropropionic acid, monosulfate esters such as lauryl sulfate for example, and also sulfuric esters of ethoxylated and propoxylated alcohols, for example butylglycol sulfate.

The dye dispersions thus obtained are very advantageous for making up dyeing liquors and print pastes.

There are certain fields of use where powder formulations are preferred. These powders comprise the dye, dispersants and other auxiliaries, for example wetting, oxidizing, preserving and dustproofing agents and the abovementioned "acid donors".

A preferred method of making pulverulent preparations of dye consists in stripping the above-described liquid dye dispersions of their liquid, for example by vacuum drying, freeze drying, by drying on drum dryers, but preferably by spray drying.

The dyeing liquors are made by diluting the requisite amounts of the above-described dye formulations with the dyeing medium, preferably water, such that a liquor ratio of 5:1 to 50:1 is obtained for dyeing. In addition, it is generally customary to include further dyeing auxiliaries, such as dispersing, wetting and fixing auxiliaries, in the liquors. Organic and inorganic acids such as acetic acid, succinic acid, boric acid or phosphoric acid are included to set a pH in the range from 4 to 5, preferably 4.5. It is advantageous to buffer the pH setting and to add a sufficient amount of a buffering system. The acetic acid/sodium acetate system is an example of an advantageous buffering system.

To use the dye or dye mixture in textile printing, the requisite amounts of the abovementioned dye formulations are kneaded in a conventional manner together with thickeners, for example alkali metal alginates or the like, and if appropriate further additives, for example fixation accelerants, wetting agents and oxidizing agents, to give print pastes.

The present invention also provides inks for digital textile printing by the ink jet process, comprising a present invention dye of the general formula (I).

The inks of the present invention are preferably aqueous and comprise one or more of the present invention's dyes of the general formula (I), for example in amounts of 0.1% to 50% by weight, preferably in amounts of 1% to 30% by weight and more preferably in amounts of 1% to 15% by weight based on the total weight of the ink. They further comprise in particular from 0.1% to 20% by weight of a dispersant. Suitable dispersants are known to one skilled in the art, are commercially available and include for example sulfonated or sulfomethylated lignins, condensation products of aromatic sulfonic acids and formaldehyde, condensation products of substituted or unsubstituted phenol and formaldehyde, polyacrylates and corresponding copolymers, modified polyurethanes and reaction products of alkylene oxides with alkylatable compounds, for example fatty alcohols, fatty amines, fatty acids, carboxamides and substituted or unsubstituted phenols.

The inks of the present invention may further comprise customary additives, for example viscosity moderators to set viscosities in the range from 1.5 to 40.0 mPas in a temperature range of 20 to 50° C. Preferred inks have a viscosity in the range from 1.5 to 20 mPas and particularly preferred inks have a viscosity in the range from 1.5 to 15 mPas.

Useful viscosity moderators include rheological additives, for example polyvinyl-caprolactam, polyvinylpyrrolidone and also their copolymers, polyetherpolyol, associative thickeners, polyureas, sodium alginates, modified galactomannans, polyetherurea, polyurethane and nonionic cellulose ethers.

By way of further additives, the inks of the present invention may include surface-active substances to set surface tensions in the range from 20 to 65 mN/m, which are if appropriate adapted depending on the process used (thermal or piezo technology). Useful surface-active substances include for example surfactants of any kind, preferably nonionic surfactants, butyldiglycol and 1,2 hexanediol.

The inks may further include customary additives, for example chemical species to inhibit fungal and bacterial growth in amounts from 0.01% to 1% by weight based on the total weight of the ink.

The inks of the present invention can be prepared in conventional manner by mixing the components in water.

Example 1

5.8 g of 6-bromo-2,4-dinitroaniline are introduced at 30 to 35° C. into a mixture of 14 ml of sulfuric acid (96%) and 0.8 ml of water. 4.3 ml of nitrosylsulfuric acid (40%) are then added dropwise at 30-35° C. during 10 minutes. The mixture is subsequently stirred at 30-35° C. for 3 hours. The diazonium salt solution thus obtained is expeditiously added dropwise to a mixture of 7.8 g of vinyloxycarbonylmethyl 3-(5-acetylamino-2-methoxyphenylamino)propionate, 100 ml of methanol, 150 g of ice and 1.1 g of urea. This is followed by stirring for one hour, filtering off with suction, washing with water and drying to leave 12.1 g of the dye of the formula (Iaba)

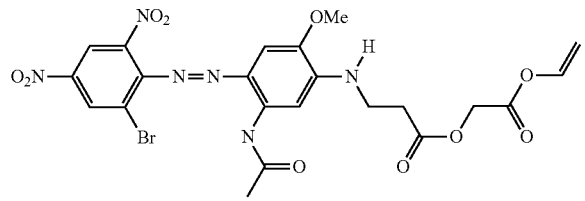

(Iaba)

($\lambda_{max}$[DMF]=594 nm) which dyes polyester in blue shades having good wash- and sublimation fastnesses.

Example 2

21.8 g of vinyloxycarbonylmethyl 3-{[3-acetylamino-4-(2-bromo-4,6-dinitrophenylazo)-phenyl]ethylamino}propionate and 3.3 g of copper(I) cyanide are stirred in 80 ml of N-methylpyrrolidone at 70° C. for 4 hours. After cooling, 100 ml of methanol and 50 ml of water are added dropwise to the batch. The precipitate is filtered off with suction and washed with methanol and water. The moist filtercake is suspended in 200 ml of 5% hydrochloric acid, filtered off with suction and washed with water. Drying under reduced pressure leaves 15 g of the dye of the formula (Iabb)

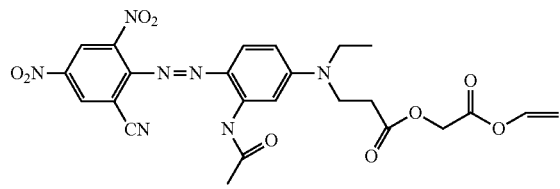

(Iabb)

($\lambda_{max}$[DMF]=600 nm) which dyes polyester in brilliant blue shades and has excellent wash- and sublimation fastnesses.

Examples 3 to 37 in Table 1 were prepared in a similar manner.

Example 38

4.9 g of 6-chloro-2,4-dinitroaniline are introduced at room temperature into 5.0 ml of sulfuric acid (78%). Then, 3.9 ml of nitrosylsulfuric acid (40%) are added dropwise at 25 to 30° C. during 10 minutes. The mixture is subsequently stirred at 25 to 30° C. for 3 hours. The diazonium salt solution thus obtained is added dropwise during an hour to a mixture of 8.3 g of 2-oxopropoxycarbonylmethyl 3-(5-acetylamino-2-methoxyphenylamino)propionate, 250 ml of methanol, 200 g of ice, 6 ml of sulfuric acid (50%) and 2 g of amidosulfonic acid. This is followed by stirring at room temperature for one hour, filtering off with suction, washing with water and drying to leave 14.6 g of the dye of the formula (Iaaa)

TABLE 1

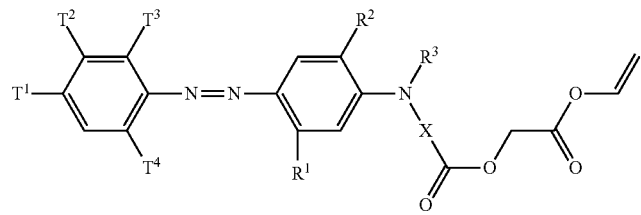

| Example | $T^1$ | $T^2$ | $T^3$ | $T^4$ | $R^1$ | $R^2$ | $R^3$ | X | $\lambda_{max}$ (nm) DMF |
|---|---|---|---|---|---|---|---|---|---|
| 3 | $NO_2$ | H | Cl | $NO_2$ | $NHCOCH_3$ | $OCH_3$ | H | —$C_2H_4$— | 594 |
| 4 | $NO_2$ | H | Cl | $NO_2$ | $NHCOCH_3$ | $OCH_3$ | H | —$C_3H_6$— | 600 |
| 5 | $NO_2$ | H | Cl | $NO_2$ | $NHCOCH_3$ | $OCH_3$ | H | —$CH(CH_3)CH_2$— | 596 |
| 6 | $NO_2$ | H | Cl | $NO_2$ | $NHCOCH_3$ | $OCH_3$ | $CH_2CH_3$ | —$C_2H_4$— | 604 |
| 7 | $NO_2$ | H | Br | $NO_2$ | $NHCOCH_3$ | $OCH_3$ | $CH_2CH_3$ | —$C_2H_4$— | 604 |
| 8 | $NO_2$ | H | H | $NO_2$ | $NHCOCH_3$ | $OCH_3$ | $CH_2CH_3$ | —$C_2H_4$— | 582 |
| 9 | $NO_2$ | H | Br | CN | $NHCOCH_3$ | $OCH_3$ | $CH_2CH_3$ | —$C_2H_4$— | 632 |
| 10 | $NO_2$ | H | Cl | $NO_2$ | $NHCOCH_3$ | $OCH_3$ | $CH_3$ | —$C_2H_4$— | 600 |
| 11 | $NO_2$ | H | Cl | $NO_2$ | $NHCOCH_3$ | $OCH_3$ | $CH_2C_6H_5$ | —$C_2H_4$— | 590 |
| 12 | $NO_2$ | H | Cl | $NO_2$ | $NHCOCH_3$ | $OCH_3$ | $CH_2CH=CH_2$ | —$C_2H_4$— | 598 |
| 13 | $NO_2$ | H | Cl | $NO_2$ | $NHCOC_2H_5$ | $OCH_3$ | $CH_2CH_3$ | —$C_2H_4$— | 608 |
| 14 | $NO_2$ | H | Cl | $NO_2$ | $NHCOCH_3$ | H | $CH_2CH_3$ | —$C_2H_4$— | 560 |
| 15 | $NO_2$ | H | Br | $NO_2$ | $NHCOCH_3$ | H | $CH_2CH_3$ | —$C_2H_4$— | 558 |
| 16 | $NO_2$ | H | H | $NO_2$ | $NHCOCH_3$ | H | $CH_2CH_3$ | —$C_2H_4$— | 548 |
| 17 | $NO_2$ | H | H | CN | $NHCOCH_3$ | H | $CH_2CH_3$ | —$C_2H_4$— | 552 |
| 18 | $NO_2$ | H | CN | CN | $NHCOCH_3$ | H | $CH_2CH_3$ | —$C_2H_4$— | 616 |
| 19 | $NO_2$ | H | CN | Br | $NHCOCH_3$ | H | $CH_2CH_3$ | —$C_2H_4$— | 582 |
| 20 | $NO_2$ | H | H | Cl | $NHCOCH_3$ | H | $CH_2CH_3$ | —$C_2H_4$— | 534 |
| 21 | $NO_2$ | H | CN | $NO_2$ | $NHCOCH_3$ | H | $CH_2CH_3$ | —$CH_2$— | 586 |
| 22 | $NO_2$ | H | H | H | H | H | $CH_2C_6H_5$ | —$C_2H_4$— | 480 |
| 23 | $NO_2$ | H | Cl | Cl | H | H | $CH_2C_6H_5$ | —$C_2H_4$— | 432 |
| 24 | $NO_2$ | H | Br | Cl | H | H | $CH_2C_6H_5$ | —$C_2H_4$— | 432 |
| 25 | $NO_2$ | H | Cl | H | H | H | $CH_2C_6H_5$ | —$C_2H_4$— | 500 |
| 26 | $NO_2$ | H | H | CN | H | H | $CH_2C_6H_5$ | —$C_2H_4$— | 524 |
| 27 | $NO_2$ | H | H | CN | H | H | $CH_2C_6H_5$ | —$CH_2$— | 508 |
| 28 | $NO_2$ | H | Cl | Cl | H | H | $CH_2CH_3$ | —$C_2H_4$— | 440 |
| 29 | $NO_2$ | H | Br | Cl | H | H | $CH_2CH_3$ | —$C_2H_4$— | 442 |
| 30 | $NO_2$ | H | Cl | H | H | H | $CH_2CH_3$ | —$C_2H_4$— | 512 |
| 31 | $NO_2$ | H | H | CN | H | H | $CH_2CH_3$ | —$C_2H_4$— | 536 |
| 32 | $NO_2$ | H | Cl | Cl | $CH_3$ | H | $CH_2CH_3$ | —$C_2H_4$— | 462 |
| 33 | $NO_2$ | H | Br | Cl | $CH_3$ | H | $CH_2CH_3$ | —$C_2H_4$— | 460 |
| 34 | $NO_2$ | H | H | Cl | $CH_3$ | H | $CH_2CH_3$ | —$C_2H_4$— | 524 |
| 35 | $NO_2$ | H | H | CN | $CH_3$ | H | $CH_2CH_3$ | —$C_2H_4$— | 548 |
| 36 | $NO_2$ | H | Br | CN | $CH_3$ | H | $CH_2CH_3$ | —$C_2H_4$— | 560 |
| 37 | $NO_2$ | H | H | Cl | $CH_3$ | H | n-butyl | —$C_2H_4$— | 526 |
| 38 | $NO_2$ | H | H | Cl | $NHCOCH_3$ | Cl | H | —$C_2H_4$— | 472 |
| 39 | $NO_2$ | H | H | H | H | Cl | H | —$C_2H_4$— | 450 |

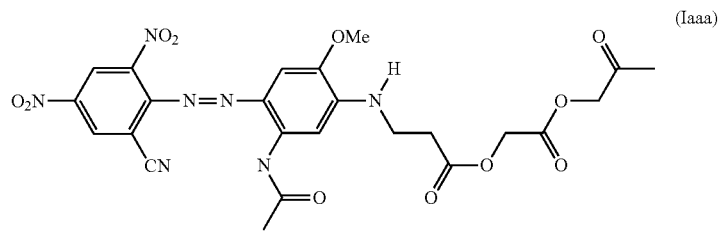

($\lambda_{max}$[DMF]=594 nm) which dyes polyester in blue shades having good wash- and sublimation fastnesses.

Example 39

12.5 g of 2-oxo-2-phenylethyloxycarbonylmethyl 3-{[3-acetylamino-4-(2-bromo-4,6-dinitrophenylazo)phenyl]ethylamino}propionate and 1.7 g of copper(I) cyanide are stirred in 50 ml of N-methylpyrrolidone at 70° C. for 4 hours. After cooling, 150 ml of methanol are added dropwise to the batch. The precipitate is filtered off with suction and washed with methanol and water. The moist filtercake is suspended in 100 ml of 5% hydrochloric acid, filtered off with suction and washed with water. Drying under reduced pressure leaves 9.3 g of the dye of the formula (Iaab)

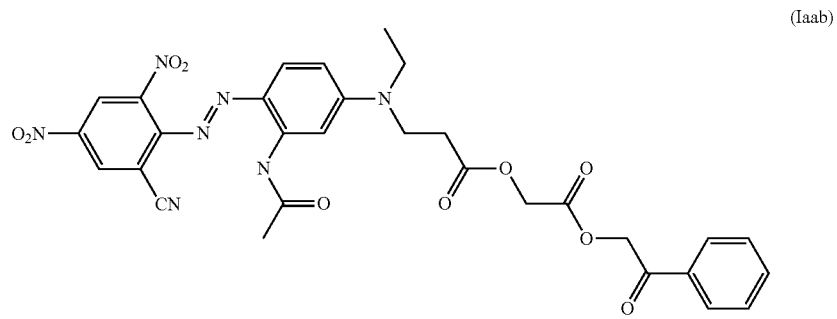

($\lambda_{max}$[DMF]=600 nm) which dyes polyester in brilliant blue shades and has excellent wash- and sublimation fastnesses.

Examples 40 to 80 in Table 2 were prepared in a similar manner.

TABLE 2

| Example | $T^1$ | $T^2$ | $T^3$ | $T^4$ | $R^1$ | $R^2$ | $R^3$ | $R^4$ | $R^6$ | $R^7$ | X | $\lambda_{max}$ (nm) DMF |
|---|---|---|---|---|---|---|---|---|---|---|---|---|
| 40 | $NO_2$ | H | Cl | $NO_2$ | $NHCOCH_3$ | $OCH_3$ | H | H | H | $CH_3$ | —$C_2H_4$— | 594 |
| 41 | $NO_2$ | H | Br | $NO_2$ | $NHCOCH_3$ | $OCH_3$ | H | H | H | $CH_3$ | —$C_2H_4$— | 594 |
| 42 | $NO_2$ | H | Cl | $NO_2$ | $NHCOCH_3$ | $OCH_3$ | H | H | $CH_3$ | $CH_3$ | —$C_2H_4$— | 594 |
| 43 | $NO_2$ | H | Cl | $NO_2$ | $NHCOCH_3$ | $OCH_3$ | H | $CH_3$ | H | $CH_3$ | —$C_2H_4$— | 594 |
| 44 | $NO_2$ | H | Br | $NO_2$ | $NHCOCH_3$ | $OCH_3$ | H | $CH_3$ | H | $CH_3$ | —$C_2H_4$— | 594 |
| 45 | $NO_2$ | H | Cl | $NO_2$ | $NHCOCH_3$ | $OCH_3$ | H | H | H | $C_6H_5$ | —$C_2H_4$— | 594 |
| 46 | $NO_2$ | H | Br | $NO_2$ | $NHCOCH_3$ | $OCH_3$ | H | H | H | $C_6H_5$ | —$C_2H_4$— | 594 |
| 47 | $NO_2$ | H | Cl | $NO_2$ | $NHCOCH_3$ | $OCH_3$ | H | $CH_3$ | H | $C_6H_5$ | —$C_2H_4$— | 594 |
| 48 | $NO_2$ | H | Br | $NO_2$ | $NHCOCH_3$ | $OCH_3$ | H | $CH_3$ | H | $C_6H_5$ | —$C_2H_4$— | 594 |
| 49 | $NO_2$ | H | Br | $NO_2$ | $NHCOCH_3$ | $OCH_3$ | $CH_2CH_3$ | H | H | $CH_3$ | —$C_2H_4$— | 604 |
| 50 | $NO_2$ | H | Cl | $NO_2$ | $NHCOCH_3$ | $OCH_3$ | $CH_2CH_3$ | H | H | $CH_3$ | —$C_2H_4$— | 604 |
| 51 | $NO_2$ | H | H | $NO_2$ | $NHCOCH_3$ | $OCH_3$ | $CH_2CH_3$ | H | H | $CH_3$ | —$C_2H_4$— | 582 |
| 52 | $NO_2$ | H | Br | $NO_2$ | $NHCOCH_3$ | $OCH_3$ | $CH_2CH_3$ | H | H | $C_6H_5$ | —$C_2H_4$— | 604 |

TABLE 2-continued

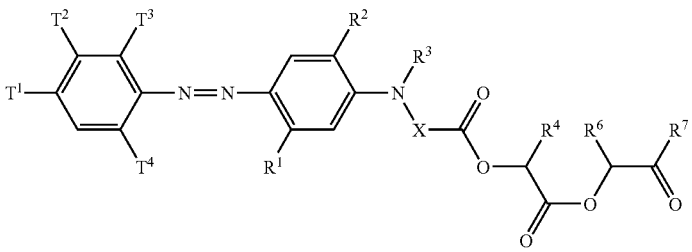

| Example | T¹ | T² | T³ | T⁴ | R¹ | R² | R³ | R⁴ | R⁶ | R⁷ | X | $\lambda_{max}$ (nm) DMF |
|---|---|---|---|---|---|---|---|---|---|---|---|---|
| 53 | NO₂ | H | Cl | NO₂ | NHCOCH₃ | OCH₃ | CH₂CH₃ | H | H | C₆H₅ | —C₂H₄— | 604 |
| 54 | NO₂ | H | H | NO₂ | NHCOCH₃ | OCH₃ | CH₂CH₃ | H | H | C₆H₅ | —C₂H₄— | 582 |
| 55 | NO₂ | H | H | NO₂ | NHCOCH₃ | H | CH₂CH₃ | H | H | C₆H₅ | —C₂H₄— | 548 |
| 56 | NO₂ | H | H | Cl | NHCOCH₃ | H | CH₂CH₃ | H | H | C₆H₅ | —C₂H₄— | 534 |
| 57 | NO₂ | H | Cl | NO₂ | NHCOCH₃ | H | CH₂CH₃ | H | H | C₆H₅ | —C₂H₄— | 560 |
| 58 | NO₂ | H | Br | NO₂ | NHCOCH₃ | H | CH₂CH₃ | H | H | C₆H₅ | —C₂H₄— | 558 |
| 59 | NO₂ | H | CN | NO₂ | NHCOCH₃ | H | CH₂CH₃ | H | H | CH₃ | —C₂H₄— | 600 |
| 60 | NO₂ | H | Cl | H | CH₃ | H | CH₂CH₃ | H | H | C₆H₅ | —C₂H₄— | 524 |
| 61 | NO₂ | H | Cl | Cl | CH₃ | H | CH₂CH₃ | H | H | C₆H₅ | —C₂H₄— | 462 |
| 62 | NO₂ | H | Cl | Br | CH₃ | H | CH₂CH₃ | H | H | C₆H₅ | —C₂H₄— | 460 |
| 63 | NO₂ | H | Br | CN | CH₃ | H | CH₂CH₃ | H | H | C₆H₅ | —C₂H₄— | 560 |
| 64 | NO₂ | H | H | CN | CH₃ | H | CH₂CH₃ | H | H | C₆H₅ | —C₂H₄— | 548 |
| 65 | NO₂ | H | H | CN | CH₃ | H | n-butyl | H | H | C₆H₅ | —C₂H₄— | 526 |
| 66 | NO₂ | H | Cl | H | CH₃ | H | CH₂CH₃ | H | H | CH₃ | —C₂H₄— | 524 |
| 67 | NO₂ | H | Cl | Cl | CH₃ | H | CH₂CH₃ | H | H | CH₃ | —C₂H₄— | 462 |
| 68 | NO₂ | H | Cl | Br | CH₃ | H | CH₂CH₃ | H | H | CH₃ | —C₂H₄— | 460 |
| 69 | NO₂ | H | Br | CN | CH₃ | H | CH₂CH₃ | H | H | CH₃ | —C₂H₄— | 560 |
| 70 | NO₂ | H | H | CN | CH₃ | H | CH₂CH₃ | H | H | CH₃ | —C₂H₄— | 548 |
| 71 | NO₂ | H | Cl | H | H | H | CH₂CH₃ | H | H | C₆H₅ | —C₂H₄— | 512 |
| 72 | NO₂ | H | Cl | Cl | H | H | CH₂CH₃ | H | H | C₆H₅ | —C₂H₄— | 442 |
| 73 | NO₂ | H | Cl | Br | H | H | CH₂CH₃ | H | H | C₆H₅ | —C₂H₄— | 440 |
| 74 | NO₂ | H | Br | Br | H | H | CH₂CH₃ | H | H | C₆H₅ | —C₂H₄— | 440 |
| 75 | NO₂ | H | Cl | Cl | H | H | CH₂C₆H₅ | H | H | CH₃ | —C₂H₄— | 432 |
| 76 | NO₂ | H | Br | Cl | H | H | CH₂C₆H₅ | H | H | CH₃ | —C₂H₄— | 432 |
| 77 | NO₂ | H | Cl | H | H | H | CH₂C₆H₅ | H | H | CH₃ | —C₂H₄— | 498 |
| 78 | NO₂ | H | H | CN | H | H | CH₂C₆H₅ | H | H | CH₃ | —C₂H₄— | 524 |
| 79 | NO₂ | H | H | Cl | NHCOCH₃ | Cl | H | H | H | CH₃ | —C₂H₄— | 472 |
| 80 | NO₂ | H | H | H | H | Cl | H | H | H | C₆H₅ | —C₂H₄— | 450 |

Example 81

4.3 g of 3-amino-5-nitrobenzisothiazole are introduced into a mixture of 11 ml of sulfuric acid (96%) and 4 ml of phosphoric acid (85%). Then, 4.6 ml of nitrosylsulfuric acid (40%) are added dropwise at 10 to 15° C. The mixture is subsequently stirred at 10 to 15° C. for 4 hours. The diazonium salt solution thus obtained is expeditiously added dropwise to a mixture of 6.0 g of vinyloxycarbonylmethyl 3-(ethylphenyl-amino)propionate, 100 ml of methanol, 1.1 g of urea and 100 g of ice. This is followed by stirring at room temperature overnight, filtering off with suction and washing with water and drying to leave 7.5 g of the dye of the formula (Ibba)

(Ibba)

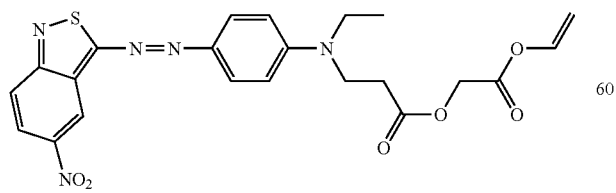

($\lambda_{max}$[DMF]=604 nm) which dyes polyester in blue shades and has very good wash- and sublimation fastnesses.

Examples 82 to 91 in Table 3 were prepared in a similar manner.

TABLE 3

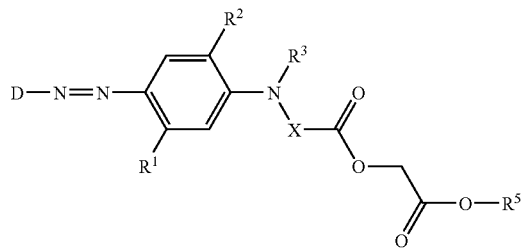

| Example | D | $R^1$ | $R^2$ | $R^3$ | $R^5$ | X | $\lambda_{max}$ [DMF] |
|---|---|---|---|---|---|---|---|
| 82 | 5-nitro-3-methyl-2,1-benzisothiazol-3-yl | H | H | $CH_2CH_3$ | $CH_2COCH_2C_6H_5$ | $-C_2H_4-$ | 606 |
| 83 | 6-nitro-2-methylbenzothiazol-2-yl | $CH_3$ | H | $CH_2CH_3$ | $CH=CH_2$ | $-C_2H_4-$ | 562 |
| 84 | 6-nitro-2-methylbenzothiazol-2-yl | H | H | $CH_2CH_3$ | $CH_2COCH_3$ | $-C_2H_4-$ | 550 |
| 85 | 5,6-dichloro-2-methylbenzothiazol-2-yl | $CH_3$ | H | $CH_2CH_3$ | $CH_2COCH_3$ | $-C_2H_4-$ | 540 |
| 86 | 3,5-dinitro-2-methylthiophen-2-yl | $CH_3$ | H | $CH_2CH_3$ | $CH=CH_2$ | $-C_2H_4-$ | 668 |
| 87 | 3,5-dinitro-2-methylthiophen-2-yl | H | H | $CH_2CH_3$ | $CH_2COCH_3$ | $-C_2H_4-$ | 650 |
| 88 | 3,5-dinitro-2-methylthiophen-2-yl | H | H | $CH_2CH_3$ | $CH_2COCH_2C_6H_5$ | $-C_2H_4-$ | 650 |
| 89 | 5-nitro-2-methylthiazol-2-yl | $NHCOCH_3$ | H | $CH_2CH_3$ | $CH=CH_2$ | $-C_2H_4-$ | 596 |

TABLE 3-continued

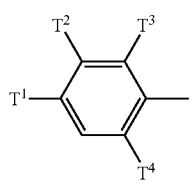

| Example | D | R¹ | R² | R³ | R⁵ | X | $\lambda_{max}$ [DMF] |
|---|---|---|---|---|---|---|---|
| 90 | (4-chloro-2-methyl-thiazole-5-carbaldehyde structure) | NHCOCH₃ | OCH₃ | H | CH=CH₂ | —C₂H₄— | 608 |
| 91 | (O₂N-phenyl-N=N-thiophene-CN structure) | H | H | CH₂CH₃ | CH₂COCH₃ | —C₂H₄— | 664 |

Example 92

A textile fabric consisting of polyester is padded with a liquor consisting of 50 g/l of 8% sodium alginate solution, 100 g/l of 8-12% carob flour ether solution and 5 g/l of monosodium phosphate in water and then dried. The wet pickup is 70%.

The textile thus pretreated is then printed with an aqueous ink prepared in accordance with the procedure described above and containing 3.5% of the dye of Example 1,
2.5% of Disperbyk 190 dispersant,
30% of 1,5-pentanediol,
5% of diethylene glycol monomethyl ether,
0.01% of Mergal K9N biocide, and
58.99% of water using a drop-on-demand (piezo) ink jet print head. The print is fully dried. Fixing is effected by means of superheated steam at 175° C. for 7 minutes. The print is subsequently subjected to an alkaline reduction clear, rinsed warm and then dried.

What is claimed is:

1. A dye of the general formula (I)

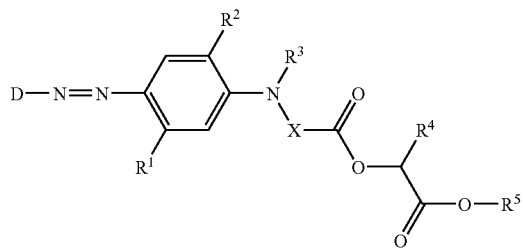

(I)

where

D is the residue of a diazo component;
R¹ is hydrogen, ($C_1$-$C_6$)-alkyl, ($C_1$-$C_4$)-alkoxy, hydroxyl, halogen, —NHCHO, —NHCO($C_1$-$C_6$)-alkyl, —NHCOaryl, —NHSO₂($C_1$-$C_6$)-alkyl or —NHSO₂aryl;
R² is hydrogen, ($C_1$-$C_6$)-alkyl, ($C_1$-$C_4$)-alkoxy, phenoxy or halogen;
R³ is hydrogen, ($C_1$-$C_6$)-alkyl, substituted ($C_1$-$C_6$)-alkyl, ($C_3$-$C_4$)-alkenyl or substituted ($C_3$-$C_4$)-alkenyl;
or R² and R³ combine to form the radical —C*H(CH₃)CH₂C(CH₃)₂—, where the carbon atom marked * is attached to the phenyl nucleus;
R⁴ is hydrogen, ($C_1$-$C_6$)-alkyl or phenyl;
R⁵ is vinyl or a group of the formula —CHR⁶COR⁷, where R⁶ is hydrogen, ($C_1$-$C_6$)-alkyl or phenyl; R⁷ is ($C_1$-$C_6$)-alkyl, substituted ($C_1$-$C_6$)-alkyl, phenyl or substituted phenyl; and
X is ($C_1$-$C_5$)-alkylene.

2. The dye as claimed in claim 1, wherein D represents a group of the formula (IIa)

(IIa)

(benzene ring with T¹, T², T³, T⁴ substituents)

where

T¹ and T² are independently hydrogen, ($C_1$-$C_6$)-alkyl, ($C_1$-$C_4$)-alkoxy, —SO₂($C_1$-$C_6$)-alkyl, —SO₂aryl, cyano, halogen or nitro; and
T⁴ and T³ are independently hydrogen, halogen, trifluoromethyl, cyano, —SCN, —SO₂CH₃ or nitro;
with the proviso that at least one of T¹, T², T³ and T⁴ is not hydrogen;

or represents a group of the formula (IIb)

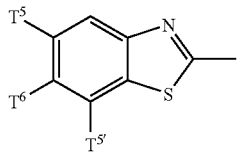

where
$T^5$ and $T^{5'}$ are independently hydrogen or halogen; and
$T^6$ is hydrogen, —$SO_2CH_3$, —SCN, $(C_1$-$C_4)$-alkoxy, halogen or nitro;
with the proviso that at least one of $T^5$, $T^{5'}$ and $T^6$ is not hydrogen;
or represents a group of the formula (IIc)

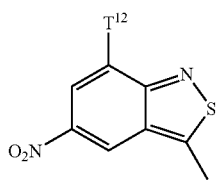

where
$T^{12}$ is hydrogen or halogen;
or represents a group of the formula (IId)

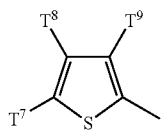

where
$T^7$ is nitro, —CHO, cyano, —$COCH_3$ or a group of the formula

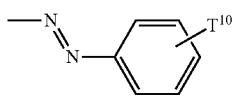

where $T^{10}$ is hydrogen, halogen, nitro or cyano;
$T^8$ is hydrogen, $(C_1$-$C_6)$-alkyl or halogen; and
$T^9$ is nitro, cyano, —$COCH_3$ or —$COOT^{11}$; where $T^{11}$ is $(C_1$-$C_4)$-alkyl;
or represents a group of the formula (IIe)

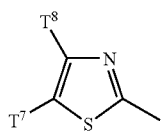

where $T^7$ and $T^8$ are each as defined above;

or represents a group of the formula (IIf)

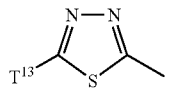

where $T^{13}$ is phenyl or S—$(C_1$-$C_4)$-alkyl;
or represents a group of the formula (IIg)

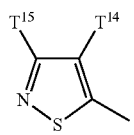

where $T^{14}$ is cyano or —$COCH_3$ or —$COOT''$, where $T^{11}$ is $(C_1$-$C_4)$-alkyl; and
$T^{15}$ is phenyl or $(C_1$-$C_4)$-alkyl;
or represents a group of the formula (IIh)

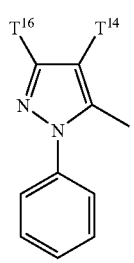

where $T^{14}$ is as defined above and $T^{16}$ is $(C_1$-$C_4)$-alkyl;
or represents a group of the formula (IIi)

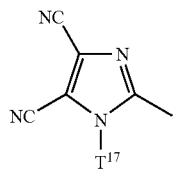

where $T^{17}$ is cyanomethyl, benzyl or allyl;
or represents a group of the formula (IIj)

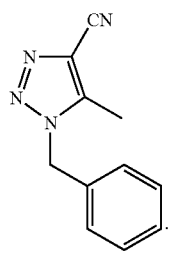

3. The dye as claimed in claim 1, wherein
$R^1$ is hydrogen, chlorine, methyl, ethyl, methoxy, hydroxyl, ethoxy, acetylamino, propionylamino, benzoylamino, methylsulfonylamino, ethylsulfonylamino or phenylsulfonylamino;

R² is hydrogen, chlorine, methyl, ethyl, methoxy, ethoxy or phenoxy;

R³ is hydrogen, methyl, ethyl, propyl, butyl, benzyl, phenylethyl, phenoxyethyl, methoxyethyl, cyanoethyl, —C₂H₄OCOCH₃, —C₂H₄OCOC₂H₅, —C₂H₄COOCH₃, —C₂H₄COOC₂H₅ or allyl;

R⁴ is hydrogen, methyl or phenyl;

R⁶ is hydrogen, methyl or phenyl;

R⁷ is methyl, ethyl or phenyl; and

X is —CH₂—, —C₂H₄—, —C₃H₆—, —CH(CH₃)CH₂— or —CH₂CH(CH₃)—.

4. The dye as claimed in claim 2, wherein

R¹ is hydrogen, chlorine, methyl, ethyl, methoxy, hydroxyl, ethoxy, acetylamino, propionylamino, benzoylamino, methylsulfonylamino, ethylsulfonylamino or phenylsulfonylamino;

R² is hydrogen, chlorine, methyl, ethyl, methoxy, ethoxy or phenoxy;

R³ is hydrogen, methyl, ethyl, propyl, butyl, benzyl, phenylethyl, phenoxyethyl, methoxyethyl, cyanoethyl, —C₂H₄OCOCH₃, —C₂H₄OCOC₂H₅, —C₂H₄COOCH₃, —C₂H₄COOC₂H₅ or allyl;

R⁴ is hydrogen, methyl or phenyl;

R⁶ is hydrogen, methyl or phenyl;

R⁷ is methyl, ethyl or phenyl; and

X is —CH₂—, —C₂H₄—, —C₃H₆—, —CH(CH₃)CH₂— or —CH₂CH(CH₃)—.

5. The dye as claimed in claim 1, conforming to the general formula (Ia)

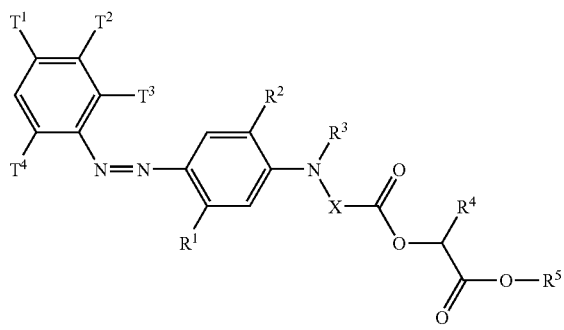

(Ia)

where T¹ to T⁴, R¹ to R⁵ and X are each as defined in claim 1.

6. The dye as claimed in claim 5, conforming to the general formula (Iaa)

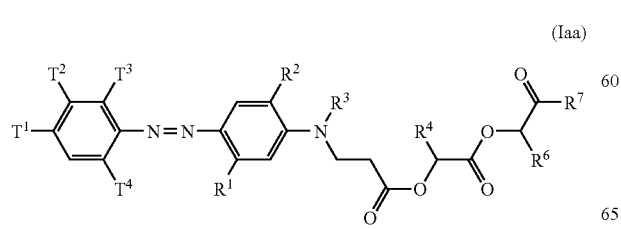

(Iaa)

where

T¹ is hydrogen, nitro, halogen or methyl;

T² is hydrogen, nitro or chlorine;

T³ is hydrogen, cyano, chlorine or bromine;

T⁴ is hydrogen, cyano, nitro, chlorine, bromine or trifluoromethyl;

R¹ is hydrogen, hydroxyl, chlorine, methyl, acetylamino, propionylamino, benzoylamino, phenylsulfonylamino or methylsulfonylamino;

R² is hydrogen, chlorine, methyl, phenoxy, methoxy or ethoxy;

R³ is hydrogen, methyl, ethyl, butyl, benzyl, phenylethyl, phenoxyethyl, methoxyethyl or allyl;

R⁴ is hydrogen, methyl or phenyl;

R⁶ is hydrogen, methyl or phenyl; and

R⁷ is methyl, ethyl or phenyl.

7. The dye as claimed in claim 5 conforming to the formula (Iab)

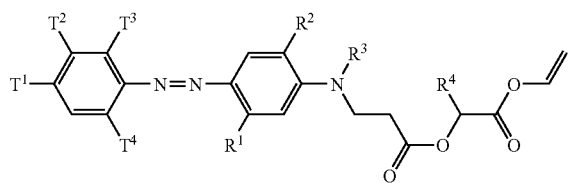

(Iab)

where

T¹ is hydrogen, nitro, halogen or methyl;

T² is hydrogen, nitro or chlorine;

T³ is hydrogen, cyano, chlorine or bromine;

T⁴ is hydrogen, cyano, nitro, chlorine, bromine or trifluoromethyl;

R¹ is hydrogen, hydroxyl, chlorine, methyl, acetylamino, propionylamino, benzoylamino, phenylsulfonylamino or methylsulfonylamino;

R² is hydrogen, chlorine, methyl, phenoxy, methoxy or ethoxy;

R³ is hydrogen, methyl, ethyl, butyl, benzyl, phenylethyl, phenoxyethyl, methoxyethyl or allyl;

R⁴ is hydrogen, methyl or phenyl.

8. The dye as claimed in claim 1 conforming to the general formula (Ib)

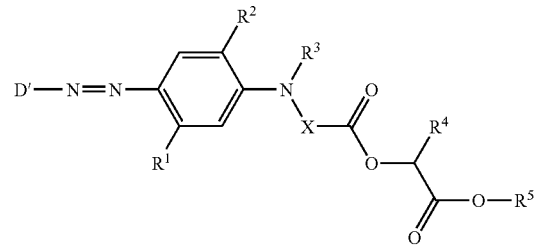

(Ib)

$R^1$ is hydrogen, $(C_1-C_6)$-alkyl, $(C_1-C_4)$-alkoxy, hydroxyl, halogen, —NHCHO, —NHCO$(C_1-C_6)$-alkyl, —NHCOaryl, —NHSO$_2(C_1-C_6)$-alkyl or —NHSO$_2$aryl;

$R^2$ is hydrogen, $(C_1-C_6)$-alkyl, $(C_1-C_4)$-alkoxy, phenoxy or halogen;

$R^3$ is hydrogen, $(C_1-C_6)$-alkyl, substituted $(C_1-C_6)$-alkyl, $(C_3-C_4)$-alkenyl or substituted $(C_3-C_4)$-alkenyl;

or $R^2$ and $R^3$ combine to form the radical —C*H(CH$_3$)CH$_2$C(CH$_3$)$_2$—, where the carbon atom marked * is attached to the phenyl nucleus;

$R^4$ is hydrogen, $(C_1-C_6)$-alkyl or phenyl;

$R^5$ is vinyl or a group of the formula —CHR$^6$COR$^7$, where $R^6$ is hydrogen, $(C_1-C_6)$-alkyl or phenyl; $R^7$ is $(C_1-C_6)$-alkyl, substituted $(C_1-C_6)$-alkyl, phenyl or substituted phenyl;

X is $(C_1-C_5)$-alkylene and

D' represents a diazo component of the formula 3,5-dicyano-4-chloro-2-thienyl, 3,5-dicyano-2-thienyl, 3,5-dicyano-4-methyl-2-thienyl, 3-cyano-5-nitro-2-thienyl, 3-cyano-4-chloro-5-formyl-2-thienyl, 3,5-dinitro-2-thienyl, 3-acetyl-5-nitro-2-thienyl, 5-acetyl-3-nitro-2-thienyl, 3-(($C_1-C_4$)-alkoxycarbonyl)-5-nitro-2-thienyl, 5-phenylazo-3-cyano-2-thienyl, 5-(4-nitrophenylazo)-3-cyano-2-thienyl, 5-nitro-2-thiazolyl, 4-chloro-5-formyl-2-thiazolyl-, 5-nitro-3-benzisothiazolyl, 7-bromo-5-nitro-3-benzisothiazolyl, 7-chloro-5-nitro-3-benzisothiazolyl, 3-methyl-4-cyano-5-isothiazolyl, 3-phenyl-1,2,4-thiadiazol-2-yl, 5-(($C_1-C_2$)-alkylmercapto))-1,3,4-thiadiazol-2-yl, 1-cyanomethyl-4,5-dicyano-2-imidazolyl, 6-nitro-2-benzthiazolyl, 5-nitro-2-benzthiazolyl, 6-rhodano-2-benzthiazolyl, 6-chloro-2-benzthiazolyl, or (5),6,(7)-dichloro-2-benzthiazolyl.

9. A process for preparing the dye of the general formula (I) as claimed in claim 1, which comprises diazotizing and coupling a compound of the general formula (III)

D-NH$_2$ (III)

where D is as defined in claim 1, onto a compound of the general formula (IV)

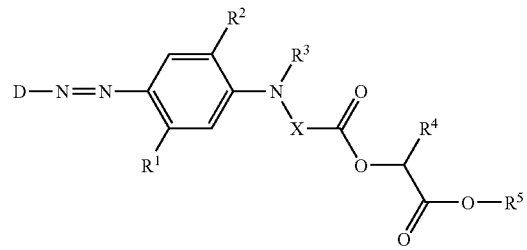

(IV)

where $R^1$ is hydrogen, $(C_1-C_6)$-alkyl, $(C_1-C_4)$-alkoxy, hydroxyl, halogen, —NHCHO, —NHCO$(C_1-C_6)$-alkyl, —NHCOaryl, —NHSO$_2(C_1-C_6)$-alkyl or —NHSO$_2$aryl;

$R^2$ is hydrogen, $(C_1-C_6)$-alkyl, $(C_1-C_4)$-alkoxy, phenoxy or halogen;

$R^3$ is hydrogen, $(C_1-C_6)$-alkyl, substituted $(C_1-C_6)$-alkyl, $(C_3-C_4)$-alkenyl or substituted $(C_3-C_4)$-alkenyl;

or $R^2$ and $R^3$ combine to form the radical —C*H(CH$_3$)CH$_2$C(CH$_3$)$_2$—, where the carbon atom marked * is attached to the phenyl nucleus;

$R^4$ is hydrogen, $(C_1-C_6)$-alkyl or phenyl;

$R^5$ is vinyl or a group of the formula —CHR$^6$COR$^7$, where $R^6$ is hydrogen, $(C_1-C_6)$-alkyl or phenyl; $R^7$ is $(C_1-C_6)$-alkyl, substituted $(C_1-C_6)$-alkyl, phenyl or substituted phenyl; and X is $(C_1-C_5)$-alkylene.

10. A process for dyeing and printing hydrophobic material which comprises contacting the dye of the general formula I as claimed in claim 1 with the material.

11. An ink for digital textile printing by the ink jet process comprising the dye of the general formula (I) as claimed in claim 1.

* * * * *